United States Patent
Leppert

(10) Patent No.: US 6,296,824 B1
(45) Date of Patent: Oct. 2, 2001

(54) METHOD FOR PRODUCING RARE EARTH OXYSULFIDE POWDER

(75) Inventor: Juergen Leppert, Forchheim (DE)

(73) Assignee: Siemens Aktiengesellschaft

( * ) Notice: Subject to any disclaimer, the term of this patent is extended or adjusted under 35 U.S.C. 154(b) by 0 days.

(21) Appl. No.: 09/524,615

(22) Filed: Mar. 14, 2000

(30) Foreign Application Priority Data

Mar. 25, 1999 (DE) .............................. 199 13 550

(51) Int. Cl.⁷ ...................................... C01F 17/00
(52) U.S. Cl. .............................................. 423/263
(58) Field of Search .................... 423/21.1, 263

(56) References Cited

U.S. PATENT DOCUMENTS 5,296,163   3/1994   Leppert et al. .

FOREIGN PATENT DOCUMENTS 59-013625  *  1/1984  (JP) .
59-021523  *  2/1984  (JP) .
59-164631  *  9/1984  (JP) .

OTHER PUBLICATIONS

Patents Abstracts of Japan, C–262, vol. 9/No. 17, Jan. 24, 1985, for Japanese application No. 58–38257.

* cited by examiner

Primary Examiner—Steven Bos
(74) Attorney, Agent, or Firm—Schiff Hardin & Waite

(57) ABSTRACT

In a method for producing rare earth oxysulfide powder, reduction of rare earth oxysulfate to rare earth oxysulfide powder ensues under a protective gas with a reducing agent which is hydrogen or carbon monoxide, or a hydrocarbon gas such as methane or propane.

17 Claims, No Drawings

METHOD FOR PRODUCING RARE EARTH OXYSULFIDE POWDER

BACKGROUND OF THE INVENTION

1. Field of the Invention

The present invention is directed to a method for producing rare earth oxysulfide powder.

2. Description of the Prior Art

Rare earth oxysulfide powders can be utilized as luminescent material powder for the manufacture of X-ray screens.

It is possible to produce translucent ceramics from such powders by means of pressing, preferably hot-pressing, scintillator elements, in turn, can be produced from these translucent ceramics for the X-ray detectors in computed tomography (CT) devices.

It is known to produce gadolinium oxysulfide powder by reducing doped gadolinium sulfite (see German PS 42 24 931). This method is complicated and requires the utilization of toxic sulfur dioxide gas for acquiring gadolinium sulfite from gadolinium oxide. Moreover, excessive sulfur is released in the form of sulfur dioxide and sulfur given the reduction of the gadolinium sulfite to gadolinium oxysulfide; this requires a complicated exhaust gas cleaning or purification. Therefore, it this known technique for the production of rare earth oxysulfide powder is technically complex and expensive.

The same is true for the method known from "Patent Abstracts of Japan", C-262, Jan. 24, 1985, vol. 9/No. 17, (for Japanese Application 59-164631), wherein rare earth oxysulfide powder is produced by reducing rare earth oxysulfate, with the rare earth oxysulfate being acquired by dissolving a rare earth oxide in sulfuric acid or sulfate, and the corresponding rare earth hydroxide is formed by adding an alkaline substance. The rare earth oxysulfate is acquired from the rare earth hydroxide by heating in an oxidizing atmosphere.

SUMMARY OF THE INVENTION

An object of the present invention is to provide a method of the above cited species, which method can be carried out with little technical outlay and which can be carried out inexpensively.

This object is inventively achieved in a method for producing rare earth oxysulfide powder, including reduction of rare earth oxysulfate to rare earth oxysulfide powder, with the rare earth oxysulfate being acquired by the method steps of suspending of at least one rare earth oxide in water, to form a slurry adding 1 mol of sulfuric acid or a corresponding dissolved sulfate of at least one of the rare earths per mol of rare earth oxide and thereby producing a powdery precipitate, and calcining the such received powdery precipitation to rare earth oxysulfate *), the at least one of the rare earths, dissolved sulfate of which is added, being one of the rare earths oxides of which are suspended in water In the inventive method, toxic sulfur dioxide does not have to be handled, since it is not required for the acquisition of rare earth oxysulfate. Moreover, only the amount of sulfur that is absolutely necessary for producing the rare earth oxysulfide is added to the rare earth oxide, so that complicated measures for exhaust gas cleaning are not required. Further, it is possible to control the sulfide content in the rare earth oxysulfide powder via the amount of the added sulfuric acid or the amount of the added sulfate by means allowing only partial conversion of the rare earth oxide into oxysulfate. The known method permits this only to a limited extent. The properties of luminescent material powder, or of scintillator ceramic, which are produced from the rare earth oxysulfide powder, which is acquired according to the inventive method, can be influenced by influencing the sulfide content.

In a version of the invention, the concentration of the suspension can be 0.01 through 2 mol of rare earth oxide per liter of water. The reaction vessel can be used more effectively due to the high concentration of up to 2 mol of rare earth oxide per liter of water. The known methods only allow concentrations of 0.1 mol oxide per liter of solution.

In an embodiment of the invention, the suspension is maintained at an increased temperature before the calcining in order to support the precipitate formation.

In a further version of the invention, at least one dopant of the group praseodymium, europium, terbium, dysprosium, holium, erbium, ytterbium, samarium, and cerium can be added to the suspension as an activator prior to the calcining, the dopant preferably added as an oxide, a hydroxide, a salt and/or a saline solution, with water-soluble salts, such as chlorides, sulfates, nitrates or acetates or aqueous solutions of these salts preferably being utilized. The aforementioned activators are materials which determine the light emission properties of the luminescent material powder or the scintillator ceramic that are produced from the rare earth oxysulfide powder. These light emission properties include not only the wavelength of the light that is emitted in an excited state, but also the duration of the excited state (persistence) given excitation by irradiation with X-radiation. In the case of scintillator ceramics, the activators are embedded in the matrix that is formed by the rare earth oxisulfide.

In a preferred version of the invention the reduction to the rare earth oxysulfide, under protective gas, ensues using a reducing agent of the group hydrogen, carbon monoxide, hydrocarbon gas, such as methane or propane. Thus, exhaust gases that contain sulfur do not arise.

In a further version of the invention, at least one rare earth oxysulfate of the group yttrium oxysulfate, lanthanum oxysulfate, gadolinium oxysulfate, lutetium oxysulfate is utilized as the rare earth oxysulfate, when the rare earth oxysulfide powder is to serve as initial material for producing X-ray screens or scintillator ceramic for X-ray detectors.

In a further version of the invention, ammonium sulfate and/or smoking sulfuric acid can also be added to the suspension before the calcining in order to introduce sulfate ions.

DESCRIPTION OF THE PREFERRED EMBODIMENTS

The invention is explained on the basis of examples for the production of gadolinium oxysulfide powder.

EXAMPLE 1

Initially, gadolinium oxide is suspended in water by stirring. The concentration can be 0.01 through 2 mol gadolinium oxide per liter of water. It is advantageous to tend toward the upper concentration range in order to efficiently use the reaction container.

Subsequently, a dopant is added as an oxide, a water-soluble salt, or an aqueous saline solution or as a mixture of these additive forms. Preferably, the additives ensues in the form of a sulfate, since the sulfate anions, which are required for the following reactions, than are already present.

Subsequently, 1 mol of sulfuric acid in a concentration of 0.5 through 98% is added to the suspension per mol of gadolinium oxide. The reaction

$$3Gd_2O_3+3H_2SO_4=2Gd_2O_3*Gd_2(SO4)_3*3H_2O$$

occurs and is completed after the end of the increase in temperature that is caused by the addition of sulfuric acid. For safety, however, the suspension can be heated until it boils and, for the precipitate formation can be kept at an increased temperature of 70 through 100° C., for example, for a period of time of 5 through 200 minutes, for example.

The precipitation that is present after the completion of the reaction can be filtered out and dried in a known way.

Given a temperature between 400° C. and 1000° C., the precipitation is subsequently calcined to gadolinium oxysulfate in the air. Calcining means driving out water by increasing the temperature. The following reaction results from the calcination:

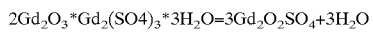

$$2Gd_2O_3*Gd_2(SO4)_3*3H_2O=3Gd_2O_2SO_4+3H_2O$$

The calcination preferably ensues within a temperature range between 600° C. and 900° C., since, on one hand, the sulfate can decompose when the temperatures are too high, and a temperature of at least 600° C. is necessary in order to ensure that out all water is driven out.

The gadolinium oxysulfate, which is present after the calcination, is reduced to gadolinium oxysulfide powder by means of hydrogen or a hydrocarbon gas, such as methane or propane, under a protective gas, such as nitrogen ($N_2$) or argon (Ar) at a temperature between 500° C. and 1000°0 C., whereby the following reaction ensues:

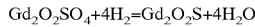

$$Gd_2O_2SO_4+4H_2=Gd_2O_2S+4H_2O$$

As it has been described in German PS 42 24 931, the now present gadolinium oxysulfide powder can be further processed to gadolinium oxysulfide ceramic or can be utilized as luminescent material powder.

EXAMPLE 2

Differing from the previously described example, a corresponding amount of an aqueous solution of gadolinium sulfate, while stirring, is added to the suspension instead of 1 mol of sulfuric acid per I mol gadolinium oxide. Subsequently, the suspension is heated until it boils and is kept at an increased temperature for a period of time that is required for the precipitate formation.

The following reaction ensues in the suspension:

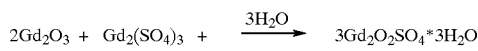

$$2Gd_2O_3 + Gd_2(SO_4)_3 + 3H_2O \rightarrow 3Gd_2O_2SO_4*3H_2O$$

The calcination of the thus-obtained compound ensues as described in connection with Example 1. Carbon monoxide is used as a reaction means for reducing the gadolinium oxysulfate that is present after the calcination. The following reaction ensues when gadolinium oxysulfate is reduced to gadolinium oxysulfide powder:

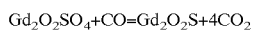

$$Gd_2O_2SO_4+CO=Gd_2O_2S+4CO_2$$

The production of gadolinium oxysulfide powder is described on the basis of the above described examples. Using yttrium oxide, lanthanum oxide and lutetium oxide as a basis, yttrium oxysulfide powder, lanthanum oxysulfide powder and lutenium oxysulfide powder can be respectively produced. Further, it is possible, proceeding from a mixture of rare earth oxides, to generate a rare earth oxysulfide powder in the previously described way, which rare earth oxypowder is a mixture of a plurality of oxysulfides of the rare earths yttrium, lanthanum, gadolinium and lutetium.

In both described examples, smoking sulfuric acid and/or ammonium sulfate, for example, in an amount of 1 mol sulfate ions/mol oxide can be added to the suspension for the above cited reason.

In the described examples, only a rare earth oxide, namely a gadolinium oxide, is described as a basis. In the context of the invention, however, a rare earth oxide or a number of rare earth oxides of the group $Y_2O_3$, $La_2O_3$, $Gd_2O_3$, $Lu_{23}$ can be used as a basis.

Rare earth oxysulfide ceramics can be produced not only by means of uniaxial hot-pressing or isostatic hot-pressing but also by sintering without pressure, from the rare earth oxysulfide that is produced according to the inventive method.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for producing rare earth oxysulfide powder comprising the steps of:
   producing a suspension of at least one rare earth oxide in water;
   adding an additive, per mol of said rare earth oxide, to said suspension selected from the group consisting of one mol sulfuric acid and a dissolved sulfate of the rare earth of said at least one rare earth oxide in amount corresponding to one mol of sulfuric acid, and thereby obtaining a precipitate from said suspension;
   calcining said precipitate to obtain a rare earth oxysulfate; and
   reducing said rare earth oxysulfate to form rare earth oxysulfide powder.

2. A method as claimed in claim 1 comprising producing said suspension with a concentration of 0.1 through 2 mol of said rare earth oxide per liter of water.

3. A method as claimed in claim 1 comprising adding sulfuric acid to said suspension as said additive in a concentration between 0.5 and 98%.

4. A method as claimed in claim 1 comprising maintaining said suspension at a temperature before said calcining which support precipitate formation.

5. A method as claimed in claim 1 comprising calcining said precipitate at a temperature in a range between 400° C. and 1000° C.

6. A method as claimed in claim 5 comprising calcining said precipitate at a temperature in a range between 600° C. and 900° C.

7. A method as claimed in claim 1 comprising adding at least one dopant to said suspension before said calcining, said at least one dopant being at least one dopant selected from the group consisting of praseodymium, europium, terbium, dysprosium, holium, erbium, ytterbium, samarium, and cerium.

8. A method as claimed in claim 7 comprising adding said at least one dopant in a form selected from the group consisting of an oxide, a hydroxide, a salt and a saline solution.

9. A method as claimed in claim 8 comprising adding said at least one dopant as a water-soluble salt.

10. A method as claimed in claim 9 comprising adding said at least one dopant in a form selected from the group consisting of a chloride, a sulfate, a nitrate, and an acetate.

11. A method as claimed in claim 8 comprising adding said at least one dopant as an aqueous saline solution.

12. A method as claimed in claim 11 comprising adding said at least one dopant as a saline solution selected from the group consisting of an aqueous chloride solution, a sulfate solution, a nitrate solution and an acetate solution.

13. A method as claimed in claim 1 wherein the step of reducing said rare earth oxysulfate comprises reducing said rare earth oxysulfate under a protective gas using a reducing agent selected from the group consisting of hydrogen, carbon monoxide, and a hydrocarbon gas.

14. A method as claimed in claim 13 wherein said hydrocarbon gas is selected from the group consisting of methane and propane.

15. A method as claimed in claim 1 comprising selecting said at least one rare earth oxide from the group consisting of yttrium oxysulfate, lanthanum oxysulfate, and lutetium oxysulfate.

16. A method as claimed in claim 15 comprising adding an additive selected from the group consisting ammonium sulfate and smoking sulfuric acid to said suspension before said calcining.

17. A method as claimed in claim 1 comprising the additional step of forming a scintillator ceramic suitable for use in computed tomography from said rare earth oxysulfide powder.

\* \* \* \* \*